(12) United States Patent
Murar et al.

(10) Patent No.: US 9,593,522 B1
(45) Date of Patent: Mar. 14, 2017

(54) SYSTEM INCLUDING A HAND-HELD COMMUNICATION DEVICE HAVING A MOTION SENSOR FOR REMOTELY CONTROLLING THE POSITION OF A DOOR OF A LAND VEHICLE AND KEY FOB FOR USE IN THE SYSTEM

(71) Applicant: JVIS-USA, LLC, Sterling Heights, MI (US)

(72) Inventors: Jason T. Murar, Macomb, MI (US); Darius J. Preisler, Macomb, MI (US); David R. Syrowik, Milford, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 0 days.

(21) Appl. No.: 15/045,847

(22) Filed: Feb. 17, 2016

(51) Int. Cl.
| | |
|---|---|
| *E05F 15/77* | (2015.01) |
| *B60J 5/10* | (2006.01) |
| *H04W 12/06* | (2009.01) |
| *H04W 64/00* | (2009.01) |
| *G01C 22/00* | (2006.01) |
| *H01Q 1/32* | (2006.01) |

(52) U.S. Cl.
CPC ............. *E05F 15/77* (2015.01); *B60J 5/10* (2013.01); *G01C 22/006* (2013.01); *H01Q 1/3233* (2013.01); *H04W 12/06* (2013.01); *H04W 64/006* (2013.01)

(58) Field of Classification Search
CPC ........... E05F 15/77; B60J 5/10; H04W 12/06; H04W 64/006; G01C 22/006; H01Q 1/3233
See application file for complete search history.

(56) References Cited

U.S. PATENT DOCUMENTS

| | | | |
|---|---|---|---|
| 6,571,193 | B1 | 5/2003 | Unuma et al. |
| 7,202,775 | B2 | 4/2007 | Yezersky et al. |
| 8,410,899 | B2 | 4/2013 | Stevenson et al. |
| 8,788,152 | B2 | 7/2014 | Reimann et al. |
| 8,849,605 | B2 | 9/2014 | Lakhzouri et al. |
| 9,162,685 | B2 | 10/2015 | Schindler et al. |
| 9,199,608 | B2 | 12/2015 | Newman et al. |
| 2010/0171642 | A1* | 7/2010 | Hassan .................. G01C 17/38 340/992 |
| 2010/0305779 | A1* | 12/2010 | Hassan .................. G01C 17/38 701/2 |
| 2011/0187492 | A1 | 8/2011 | Newman et al. |

(Continued)

*Primary Examiner* — Russell Frejd
(74) *Attorney, Agent, or Firm* — Brooks Kushman P.C.

(57) ABSTRACT

A system for remotely controlling the position of a land vehicle door is provided. The system includes a mobile communication device supported on the vehicle for movement therewith and a hand-held communication device such as a key fob including a motion sensor operative to provide motion signals as a function of motions made by a pedestrian carrying the hand-held device. Control logic is coupled to the devices and is operative to detect a sequence of step motions made by the pedestrian carrying an authorized hand-held device when the pedestrian carrying the authorized hand-held device is located within a predetermined, short range of the mobile device and to generate a door-opening control signal based on command data contained within a command signal transmitted by the hand-held device and/or when the control logic recognizes the detected sequence of step motions as a door-opening pedestrian command.

23 Claims, 3 Drawing Sheets

(56) References Cited

U.S. PATENT DOCUMENTS

| | | |
|---|---|---|
| 2011/0313619 A1 | 12/2011 | Washeleski et al. |
| 2012/0249291 A1 | 10/2012 | Holcomb et al. |
| 2013/0311039 A1 | 11/2013 | Washeleski et al. |
| 2014/0207343 A1* | 7/2014 | Kigoshi .................. E05F 15/77 701/49 |
| 2015/0021887 A1 | 1/2015 | Hiraiwa et al. |
| 2015/0258962 A1 | 9/2015 | Khanu |
| 2015/0279131 A1 | 10/2015 | Nespolo |
| 2015/0284984 A1 | 10/2015 | Kanter et al. |
| 2015/0287257 A1 | 10/2015 | Thompson |

\* cited by examiner

SYSTEM INCLUDING A HAND-HELD COMMUNICATION DEVICE HAVING A MOTION SENSOR FOR REMOTELY CONTROLLING THE POSITION OF A DOOR OF A LAND VEHICLE AND KEY FOB FOR USE IN THE SYSTEM

TECHNICAL FIELD

This invention generally relates to systems for remotely controlling the position of doors of land vehicles and key fobs for use in such systems.

OVERVIEW

As described in the Wikipedia entry entitled "Remote Keyless System", the term remote keyless system (RKS), also called keyless entry or remote central locking, refers to a lock that uses an electronic remote control as a key which is activated by a hand-held device or automatically by proximity.

Widely used in land vehicles such as automobiles, an RKS performs the functions of a standard car key without physical contact to control access to the vehicle. When within a few yards of the car, pressing a button on the remote can lock and unlock the doors, and may perform other functions. A remote keyless system can include both a remote keyless entry system (RKE), which unlocks the doors, and a remote keyless ignition system (RKI), which starts the engine.

Keyless remotes contain a short-range radio transmitter, and must be within a certain range, usually 5-20 meters, of the car to work. When a button is pushed, it sends a coded signal by radio waves to a receiver unit in the car, which locks or unlocks the door. Most RKEs operate at a frequency of 315 MHz for North America-made cars and at 433.92 MHz for European, Japanese and Asian cars. Modern systems implement encryption to prevent car thieves from intercepting and spoofing the signal. Earlier systems used infrared instead of radio frequency signals to unlock the vehicle.

The system may signal that it has either locked or unlocked the car usually through some fairly discreet combination of flashing vehicle lamps, a distinctive sound other than the horn, or some usage of the horn itself. A typical setup on cars is to have the horn or other sound chirp twice to signify that the car has been unlocked, and chirp once to indicate the car has been locked. Two beeps means that the driver's door is unlocked, four beeps means all doors are unlocked. One long beep is for the trunk or power tailgate. One short beep signifies that the car is locked and alarm is set.

The functions of a remote keyless entry system are often contained on the remote or key fob (i.e. or just "fob") or built into the ignition key handle itself. FIG. 2 is an exploded perspective view of a prior art key fob, generally indicated at 2, having upper and lower housing parts 3, a one-piece plastic protective covering 9, a loop antenna 4, a plurality of push buttons 5, an RF transmitter 6, a battery 7 and a semiconductor device 8 which typically stores (in memory) or generates identification data which identifies the particular key fob 2. When an RF signal is transmitted or emitted from the antenna 4 of the transmitter 6, the signal contains the identification data. In turn, a mobile communication device (not shown) including a receiver having an antenna is supported on the vehicle receives the signal and removes or extracts the identification data from the RF signal to determine if the key fob 2 is an authorized key fob.

The buttons 5 are dedicated to locking or unlocking the doors and opening the trunk or tailgate. On some minivans the power sliding doors can be opened/closed remotely. Some cars will also close any open windows and roof when remotely locking the car. Some remotes or key fobs also feature a panic button which activates the car alarm as a standard feature. Further adding to the convenience, some cars' engines with remote keyless ignition systems can be started by the push of one of the buttons 5 on the key fob 2, and convertible tops can be raised and lowered from the outside the vehicle while it's parked.

On cars where the trunk release is electronically operated, it can be triggered to open by one of the buttons on the remote 2. Conventionally, the trunk springs open with the help of hydraulic struts or torsion springs, and thereafter must be lowered manually. Premium models, such as SUVs and estates with tailgates, may have a motorized assist that can both open and close the tailgate for easy access and remote operation.

Some cars have a proximity system that is triggered if a keylike transducer is within a certain distance of the car. Such systems are sometimes called hands-free or advanced key. With such a smart key system, a vehicle can be unlocked without the driver needing to physically push a button on the key fob to lock or unlock the car and is also able to start or stop the ignition without physically having to insert the key and turning the ignition. Instead, the vehicle senses that the key (located in a pocket, purse, etc.) is approaching the vehicle. When the key fob is within the car's required "bubble" distance (i.e., the required distance or range from the vehicle for the key to be recognized), there are two methods typically used by auto manufacturers to unlock the doors;

the car will automatically unlock the driver's door; and the car doesn't unlock the door unless the keyholder touches one of the sensors located behind the door handles.

In certain vehicles there are also various functions built into the transmitter to perform various tasks. For instance, pressing the unlock button twice and keeping the button depressed on the second push allows the keyholder to roll down certain pre-programmed windows and/or the sunroof. Other functions range from turning on the headlights and various electronic equipment (factory or aftermarket). On some vehicles, the system prevents the driver or passenger from accidentally locking the keys in the car, via a sensor that detects whether the keyholder is within the "bubble" area outside the vehicle.

For purposes of this application, the term "vehicle door" is used to describe a hinged or sliding barrier in front of a vehicle opening which can be opened to provide access to the opening or closed to secure the opening. The term "vehicle door" includes but is not limited to, liftgates, tailgates and trunk lids.

For purposes of this application the term "transceiver" (i.e. transmitter/receiver) refers to a device that performs, with a single, common housing, package or structure (such as a chassis or chip), both transmitting and receiving functions, preferably using common circuit components for both transmitting and receiving.

For purposes of this application "multi-modal" refers to operability using different protocols, which may include one or more of different modulation schemes, different frequencies and different standards.

As used herein, the term "sensor" is used to describe a circuit or assembly that includes a sensing element and other components. In particular, at used herein, the term "motion sensor" is used to describe a circuit or assembly that includes a motion sensing element and electronics coupled to the motion sensing element. Motion sensors can be, but are not limited to, inertial sensors.

As used herein, the term "step motion" is used to describe pedestrian motions, such as walking, running, and stepping, as well as standing still (i.e., substantially no pedestrian motion).

As used herein, the term "motion sensing element" is used to describe a variety of electronic elements that can sense a motion. The motion sensing elements can be, but are not limited to, multi-axis accelerometers and/or gyroscopes.

For purposes of this application, "protocol" refers to a set of conventions governing the format and control of interaction among communicating functional units, and in general permitting devices and information systems to exchange data or information. Protocol may include semantic and syntactic rules that determine the behavior of entities in performing communication functions. Protocols may govern portions of a network, types of service, or administrative procedures. For example, a data link protocol is the specification of methods whereby data communications over a data link are performed in terms of the particular transmission mode, control procedures, and recover procedures. Protocols include the specific modulation formats and frequencies associated with the modulation formats.

Related U.S. patent documents include U.S. Pat. Nos. 6,571,193; 7,202,775; 8,410,899, 8,788,152; 9,162,685; 2012/0249291; 2015/0021887; 2015/0258962; 2015/0279131; and 2015/0284984.

As described in 2015/0287257, smart phone applications have been developed to give smart phones the functionality of a key fob. For example, a smart phone with the appropriate software application or computer program(s) can be used in place of an electronic key fob to lock and unlock doors, control a car find feature (audible horn honk), start a vehicle remotely, or program auxiliary outputs (like trunk release). However, the wireless communication between the phone and the car generally occurs over a cellular network, thereby introducing latency between command and response time, as well as an increase in cost.

In view of the above, it is known to provide a powered tailgate on motor vehicles to facilitate access to the vehicle. The powered tailgate can, for example, be activated by pressing a button on a key fob. However, a potential problem arises if the user is carrying a small child and/or objects, such as boxes, luggage, shopping etc., with both hands and cannot readily access the key fob without setting one or more objects down.

At least one prior art document discloses a capacitive sensor arrangement mounted to a tail apron of a parked vehicle. The capacitor sensor arrangement is configured to detect a gesture in the form of swiveling action or kick of the user's foot under the tail apron and the system recognizes the remote entry key or the user. Upon detection of the swiveling action, the vehicle tailgate is automatically opened. As shown in FIG. 1, however, the required gesture to open the tailgate is not intuitive and could cause the user to become unbalanced, especially if the parking surface is slippery. Disabled and elderly persons may also find it difficult to press the desired button or the key fob or to make the required foot gesture. Another potential problem is that such capacitive sensors may get covered by snow, ice and/or dirt.

As previously mentioned, remote keyless entry fobs are generally used to remotely lock and unlock vehicle doors. As an example, a fob may have a button, a battery and a transmitter. Upon pushing the button, the transmitter sends a signal to a vehicle equipped with a receiver, and the receiver subsequently causes the vehicle door to unlock. One issue with such a system is that many vehicles now have multiple functions which may be controlled by the remote fob. Examples of such functions include power sliding doors, sun roofs, alarm systems, trunks, lift gages, and the vehicle doors. Implementing the increased functionality with a button-based fob causes the battery of the fob to quickly drain. Insufficient battery life is a problem which will only get larger as new functions are added to the fob.

SUMMARY OF EXAMPLE EMBODIMENTS

An object of at least one embodiment of the present invention is to provide a system and a hand-held communication device, such as a key fob, for use therein for remotely controlling the position of a door such as a liftgate/tail-gate of a land vehicle wherein the device includes a motion sensor to provide motion signals as a function of motions made by a pedestrian carrying the device.

In carrying out the above object and other objects of at least one embodiment of the present invention, a system for remotely controlling the position of a land vehicle door is provided. The door is capable of moving between a closed position in which the door covers a vehicle opening and an opened position in which the door uncovers the opening to provide access to the opening. The system includes a mobile communication device supported on the vehicle for movement therewith and a hand-held communication device including a motion sensor operative to provide motion signals as a function of motions made by a pedestrian carrying the hand-held device. The system further includes control logic coupled to the devices. The hand-held and mobile communication devices are capable of wirelessly transmitting and receiving, respectively, command signals as long as the pedestrian carrying the hand-held device is within a first range of the mobile device. Each of the command signals contains identification data which identifies the hand-held device and command data which identifies a pedestrian command for the vehicle to automatically perform an operation. The mobile device is operative to remove the identification and command data from the command signals and the control logic is operative to determine if the hand-held device is an authorized hand-held device based on the identification data. The control logic is operative to detect a sequence of step motions made by the pedestrian carrying an authorized hand-held device when the pedestrian carrying the authorized hand-held device is located within a second range of the mobile device and to generate a door-opening control signal based on the command data when the control logic recognizes the detected sequence of step motions as a door-opening pedestrian command. The second range is less than the first range.

The step motions may include walking, standing still and stepping.

The motion sensor may comprise an inertial motion sensor which may be a multi-axis accelerometer to measure linear acceleration.

The hand-held device may include an energy storage device to supply stored electrical energy to the control logic and the motion sensor. The energy storage device may comprise a battery.

The mobile device may include a receiver wherein the hand-held device includes a transmitter to wirelessly transmit the command signals which are received by the receiver.

The hand-held device may include a user interface coupled to the control logic wherein the control logic is operative to determine whether the pedestrian has activated the interface to control the transmitter to transmit one of the command signals.

The user interface may include a push button dedicated to opening the vehicle door.

The hand-held device may be a key fob.

The mobile device may include a first transceiver wherein the hand-held device includes a second transceiver that communicates with the first transceiver via two-way communication. The control logic may monitor the position of the hand-held device with respect to the mobile device based on data received from the second transceiver.

The system may further include a memory for storing reference data which represents a predetermined sequence of step motions. The control logic retrieves the reference data from the memory in order to recognize the predetermined sequence of step motions as the door-opening, pedestrian command.

Further in carrying out the above object and other objects of at least one embodiment of the present invention a key fob for use in a remote control system which controls the position of a land vehicle door is provided. The door is capable of moving between a closed position in which the door covers a vehicle opening and an opened position in which the door uncovers the opening to provide access to the opening. The system has a mobile communication device supported on the vehicle for movement therewith. The key fob includes a hand-held communication device having a motion sensor operative to provide motion signals as a function of motions made by a pedestrian carrying the hand-held device and control logic coupled to the motion sensor. The key fob is capable of wirelessly transmitting command signals as long as the pedestrian carrying the key fob is within a first range of the mobile device. Each of the command signals contains identification data which identifies the key fob and command data which identifies a pedestrian command for the vehicle to automatically perform an operation. The mobile device is operative to remove the identification and command data from the command signals. The control logic is operative to determine if the key fob is an authorized key fob based on the identification data. The control logic is operative to detect a sequence of step motions made by the pedestrian carrying an authorized key fob when the pedestrian carrying the authorized key fob is located within a second range of the mobile device and to generate a door-opening control signal based on the command data when the control logic recognizes the detected sequence of step motions as a door-opening pedestrian command. The second range is less than the first range.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
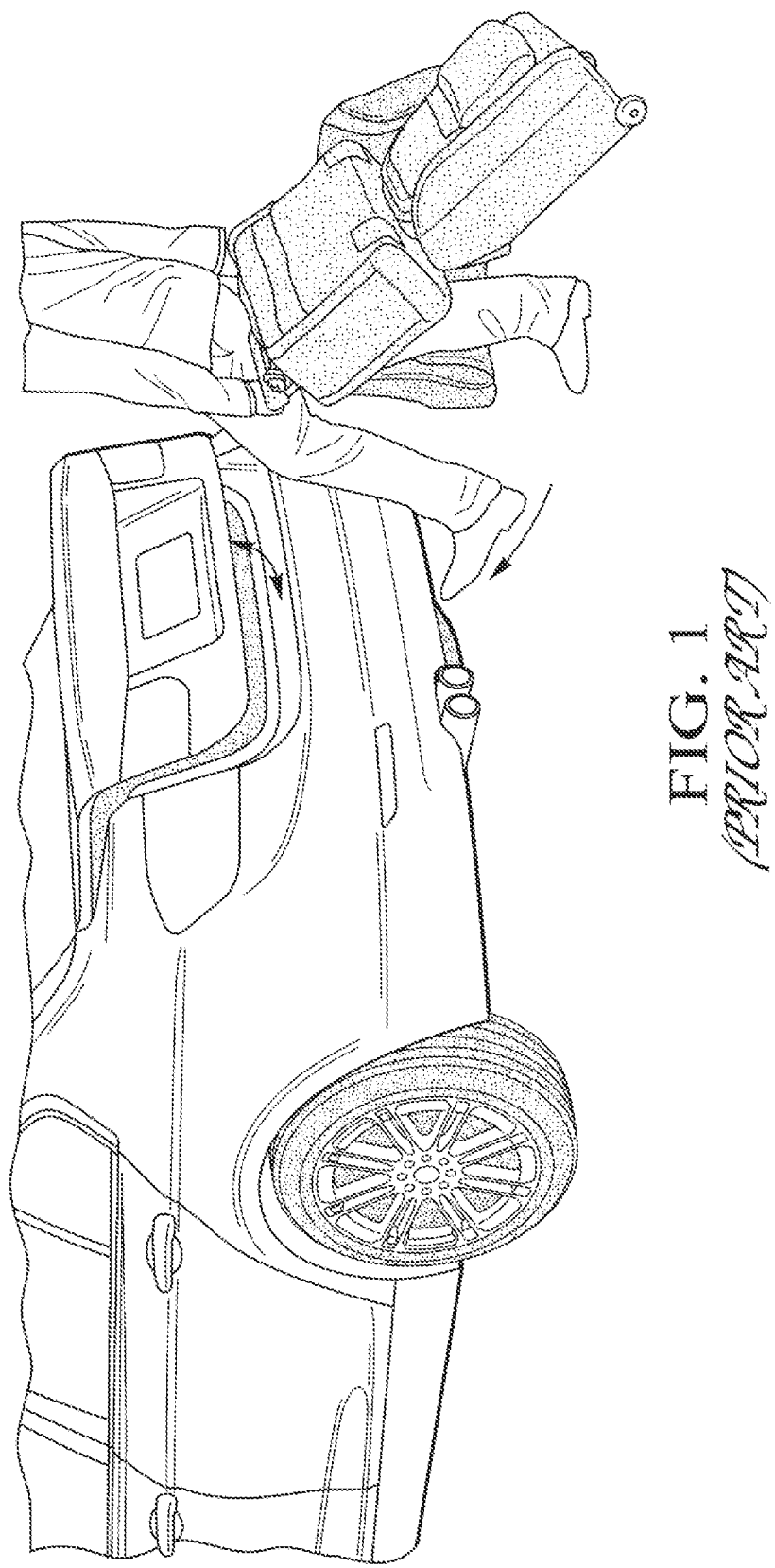
FIG. 1 is a schematic view, partially broken away, of a land vehicle and a pedestrian gesturing with his leg under a tail apron of the vehicle wherein the trunk door or lid is in the process of opening.
Figure 2:
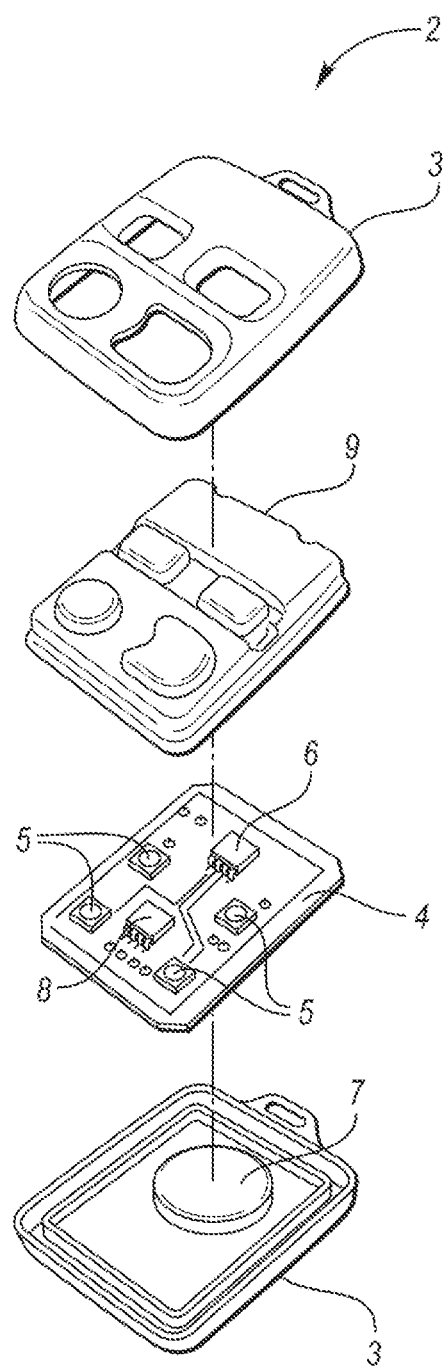
FIG. 2 is an exploded perspective view of a prior art key fob.
Figure 3:
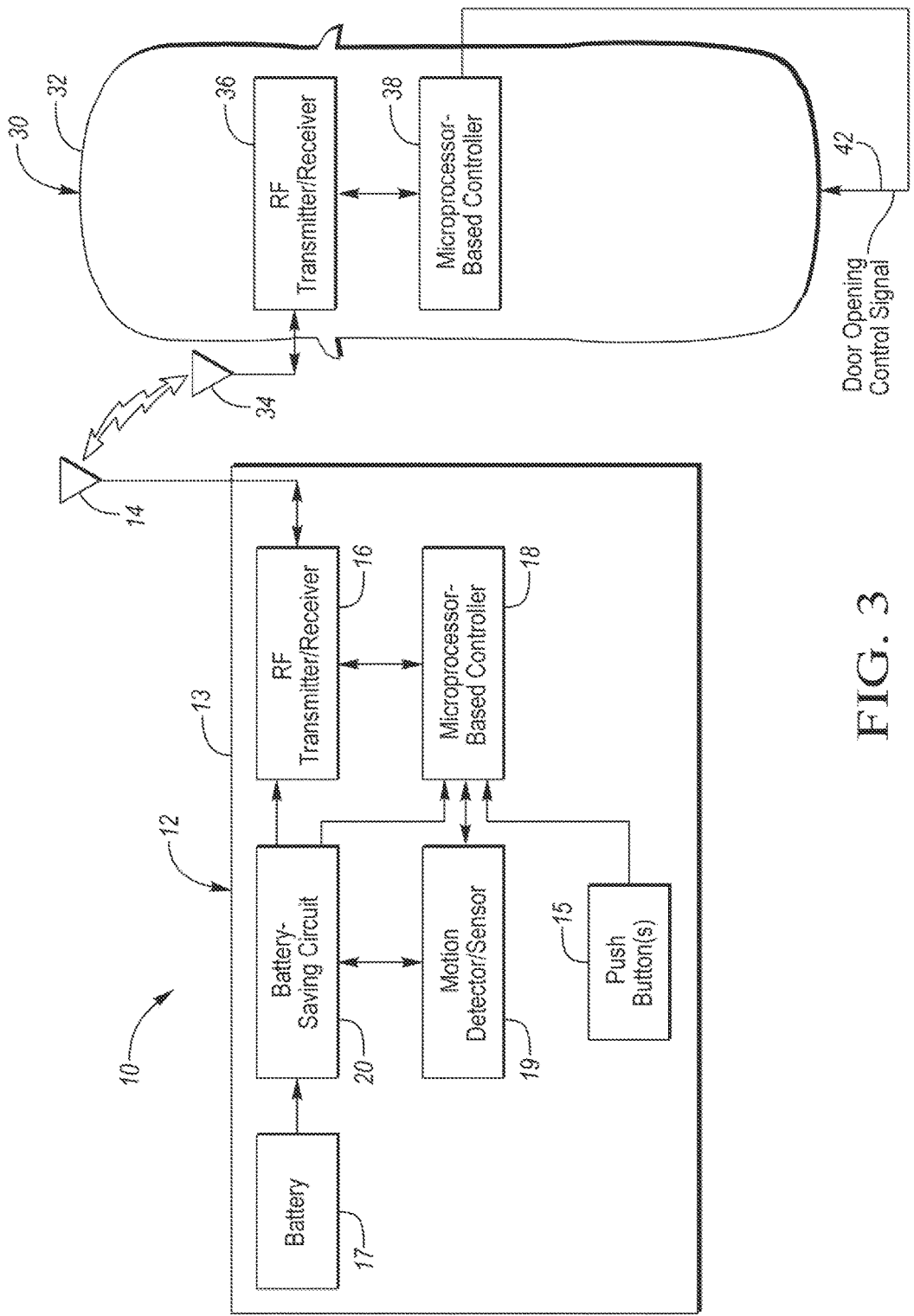
FIG. 3 is a block diagram of at least one embodiment of the present invention, including a mobile communication device supported on the vehicle and a hand-held communication device such as a key fob for remotely controlling the position of the trunk door or lid (i.e. vehicle door).

Referring now to FIG. 3, a system, generally indicated at 10, is provided for remotely controlling the position of a land vehicle door as disclosed in FIG. 1 as a trunk lid. The door is capable of moving between a closed position in which the door covers a vehicle opening, such as a trunk opening, and an opened position in which the door uncovers the opening to provide access in the opening or trunk of a vehicle 32.

The system 10 includes a mobile communication device, generally indicated at 30, supported on the vehicle 32 for movement therewith and a hand-held communication device, generally indicated at 12, including a motion sensor or detector 19 operative to provide motion signals to a microprocessor-based controller 18 as a function of motions made by a pedestrian carrying the hand-held device 12. The system 10 further includes control logic coupled to the devices 12 and 30. As described in detail herein below, the control logic is preferably implemented by software in one or both of the microprocessor-based controllers 18 and 38.

Each of the hand-held and mobile communication devices 12 and 30 are capable of wirelessly transmitting and receiving, respectively, RF command signals via transceivers 16 and 36 as long as the pedestrian carrying the hand-held device 12 is within a first range of the mobile device 30. Each of the command signals contains identification data which identifies the hand-held device 12 and command data which identifies a pedestrian command for the vehicle 32 to automatically perform an operation. The mobile device 30 is operative to remove the identification and command data from the command signals and the control logic is operative to determine if the hand-held device 12 is an authorized hand-held device 12 based on the identification data.

The control logic (within the controller 18 and/or within the controller 38) is operative to detect a sequence of step motions made by the pedestrian carrying an authorized hand-held device 12 when the pedestrian carrying the authorized hand-held device 12 is located within a second near or proximate range of the mobile device 30 (such as within a foot or two) and to generate a door-opening control signal based on the command data when the control logic recognizes the detected sequence of step motions as a door-opening pedestrian command. The second range is less than the first range. For example, the first range may be 3 to 100 feet and the second range may be within 3 feet.

The step motions may include walking, standing still and stepping such as disclosed in U.S. Pat. No. 8,849,605. The motion sensor may comprise an inertial motion sensor which may be a multi-axis accelerometer to measure linear acceleration.

The hand-held device 12 may include an energy storage device to supply stored electrical energy to the control logic and the motion sensor. The energy storage device may comprise a battery 17.

The mobile device 30 may include an RF receiver or transceiver 36 wherein the hand-held device 12 includes a transmitter or transceiver 16 to wirelessly transmit the command signals which are received by the receiver 36.

The hand-held device 12 may include a user interface 15 coupled to the control logic or controller 18 wherein the control logic 18 is operative to determine whether the pedestrian has activated the interface 15 to control the transmitter 16 to transmit one of the command signals. The user interface may include one or more push buttons 15 one of which is dedicated to opening the vehicle door.

The hand-held device 12 may be a key fob 12.

The mobile device 30 may include the first transceiver 36 wherein the hand-held device 12 includes the second transceiver 16 that communicates with the first transceiver 36 via two-way communication. The control logic within the controller 38 may monitor the position of the hand-held device with respect to the mobile device 30 based on data received from the second transceiver 16.

The system 10 may further include memory within the controller 18 and/or the controller 38 for storing reference data which represents a predetermined sequence of step motions. The control logic retrieves the reference data from the memory in order to recognize the predetermined sequence of step motions as the door-opening, pedestrian command.

The hand-held device 12 can be any hand-held device with a wireless interface, such as a laptop computer, a tablet device, a key fob, a car key, an access card, a mobile phone, a portable gaming device, a portable multimedia player, a portable music player, a personal digital assistant (PDA), any hand-held electronic or electro-mechanical device. For example, such a hand-held device can be an iPod®, iPhone®, or iPad® device available from Apple Inc. of Cupertino, Calif. In one embodiment, the fob 12 includes the motion sensor 19 for sensing motion of a pedestrian carrying the fob 12. The motions of the pedestrian may be interpreted by the microcontroller 18 or a digital signal processor, which executes instructions according to a predetermined program. When the controller 18 recognizes or detects a predetermined sequence of step motions it causes the transmitter or transceiver 16 to send RF control signals via an antenna 14. The antenna 14 may be located internal or external to the fob housing 13.

Some personal hand-held electronic devices such as some mobile phones, have implemented MEMS inertial sensors. For example, the Nokia 5500 sports phone uses an embedded 3-axis MEMS inertial sensor to detect the steps a user takes. The step counter or pedometer software application within the Nokia 5500 then tracks the steps taken, time lapsed and distanced traveled (once a standardized step distance has been entered).

The vehicle 32 typically has several functions that may be controlled by the fob 12. By way of non-limiting example, the vehicle 32 may have controlled an opening hood, a front door, a rearward hinged or sliding door, a trunk or lift gate, head lamps, tail lamps, and an alarm tone.

The vehicle 32 can be any suitable transportation machinery, such as an automobile, a truck, a bus, a train, a tractor, a golf cart, a go-kart, a motorcycle, a scooter, a motorized bicycle, a boat, a watercraft (e.g., a jet-ski), an aircraft, a lawn mower, a snowmobile, a remote controlled device (e.g., remote controlled car or airplane), and/or the like.

The microcontroller 18 determines when a command control signal should be transmitted to the vehicle 32. The vehicle antenna 34 receives the command signal and sends it to the receiver 36 for processing. The controller 38 then causes action to be taken in correspondence with the received command signal, such as emitting a door opening command signal along a wire or vehicle bus 42. For example, if the fob 12 determines that the fob user would like to open the trunk lid, then the fob sends a command signal corresponding to a trunk opening function. The vehicle 32 will receive and process the command signal via the antenna 34 and the receiver 36, and affect the opening of the trunk lid. Similarly, the fob 12 and the device 30 may work together to operate the other functions of the vehicle 32.

The controller 18 receives sensor data or signals from the motion sensor 19. Once received from the motion sensor 19, the transmitter 16 retransmits the data or signals in analog form or, alternatively, in digitally encoded form with the digital encoding taking place in the controller 38. In such an embodiment, the vehicle 32 is equipped with the microprocessor-based controller 38 for receiving, recognizing, and effecting action based upon the commands. Such an arrangement allows the fob 12 to be used regardless of the vehicle's option contents. If the vehicle 32 is equipped with a transmitter, such as transceiver 36, then the fob 12 may be equipped with the transceiver 16 for receiving signals from the vehicle 32 in addition to transmitting signals to the vehicle 32.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by the microprocessor-based controller 18 and/or the controller 38. Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like. For example, the computer-readable storage media may include volatile and nonvolatile storage in read-only (ROM), random-access memory (RAM), and keep-alive memory (KAM). For example, KAM may be used to store various operating variables. The computer-readable storage media may be implemented using any of a number of known memory devices such as PROMs (programmable read-only memory), EPROMs (electrically PROM), EEPROMs (electrically erasable PROM) and/or flash memory.

The control system 10 of at least one embodiment of the invention may comprise the generally hand-held communication device such as the key fob 12 and control logic which controls communication between the fob 12 and the receiver 36. The fob 12 is generally hand-held by users or pedestrians and/or is carried within objects, such as pockets and purses. The fob 12 is generally operable to communicate identification information or data to the device 30.

Fobs, such as the fob 12, may serve different functions and be associated with either users or objects. As shown in FIG. 3, the fob 12 and the receiver 36 generally each include a transmitter, a receiver, a combination transmitter and receiver (i.e. a transceiver), a transponder or other receiving or transmitting mechanisms suitable for communicating identification and/or command information between the fob 12 and the receiver 36.

The power source for the fob 12 may, in many embodiments, include the battery 17 or other such energy storage element. In some embodiments, additional power source elements may be present. For example, the fob 12 may include capacitive or inductive-based vibratory energy converters for generating energy from kinetic energy. Such a converter may be used to supply a trickle charge for recharging the battery 17 when the fob 12 is in motion. In other embodiments, the fob 12 may include solar or other energy converters for harvesting energy and charging the battery 17. The fob 12 may also or alternatively be equipped with a recharging port to permit connection to a recharger.

The fob 12 may also include a battery-saving circuit 20 coupled to the battery 17, the sensor 19, the controller 18 and the transmitter 16 to provide power from the battery 17 when the fob 12 is "awake", such as when the sensor 19 detects that the fob 12 is in motion. Otherwise, when the fob 12 is not "awake" a lower level of current is provided.

For purposes of unidirectional and bidirectional communication of data or other signaling between the fob 12 and the device 30, several formats/protocols exist, and may be utilized. The system may utilize fobs using different technologies or fobs combining different technologies.

The fob 12 may include a database (i.e. within the controller 18) to store tracking processes, fob specific event data or non-tracking process subject data. Event data includes the fob's location and switch state's history. Subject data includes data or pointers to data (information needed to retrieve the data from another source) such as name or record number pertinent to each fob's subject.

One or more fobs having a unique ID are typically provided for each vehicle. The fobs also typically include one or more inertial sensors such as accelerometers to sense the movement or orientation of the fobs. The accelerometers may provide input or feedback regarding the movement of the fob, and, thus, the pedestrian user or object with which it is associated. By way of example, the accelerometers may include a 3-axis accelerometer.

U.S. Pat. No. 8,849,605, discloses a 3-axis accelerometer. The apparatus of the '605 patent may differentiate between walking, running, standing still, or any random movement that the pedestrian may perform. The microcontroller 18 and/or controller 38 may perform a time domain and frequency domain analysis on the motion signals. The time domain analysis may be based on a Teager-Kaiser Energy Operator. The frequency domain analysis may be based on a fast Fourier transform.

The method performed by the microcontroller 18 and/or the controller 38 may comprise the steps of determining the magnitude of the output of an accelerometer (i.e. motion sensor 19), processing the magnitude in the Teager-Kaiser Energy Operator and the fast Fourier transform. Then status of the processed information is determined in a first peak detection and a second peak detection; and subsequently the step motion may be determined from a look-up table. The step motion may comprise running, walking and standing still.

As previously mentioned, the fob 12 may communicate with the device 30 in a bidirectional fashion. The fob 12 may be programmed with data, and may communicate data.

The fob 12 may include a sensor to receive information from the device 30 and may be configured to transmit information based upon the input from the device 30. The fob 12 or its receiver 16 may be designed to sense a particular environment, such as a RF signal from the device 30 in the radio frequency range.

The fob 12 (as well as the device 30) of at least one embodiment of the present invention may include elements generally found in many communication devices, whether individually or part of an integrated circuit or microcontroller, and including elements integrated into a single chip. As previously mentioned, these elements may include a battery, antenna interfaces, antenna(s), modulators, demodulators, transceivers, duplexers, RF switches, filter, I/Os, UARTs, interrupts, memory, modems and the like, and the code to operate the device elements.

The fob 12 may further include an RF receiver as part of a transceiver 16 that is operable to receive a signal from the transceiver 36 of the device 30 via the antenna 34. The fob 12 may be operable to activate either a visual, audible or tactile alert indicator in response to receiving the signal from the transceiver 36.

The RF signal transmitted from the fob's antenna 14 may be modulated to represent each fob's unique ID number. Each vehicle's identification data is associated with each unique fob number. This provision allows the control logic of the controller 38 to associate unique fob data with the particular vehicle.

The fob 12 may transmit a radio frequency (i.e. RF) signal via the antenna 14, containing a data packet with at least the unique fob ID, in a substantially spherical pattern. The radio frequency signals emitted by the antenna 14 are received by the antenna 34 of the receiver 36 of the device 30 having a predetermined range in all directions. The radio frequency receiver 36 converts encoded signals emitted by the fob 12 into electrical signals or data and transmits them to the controller 38 for processing and then via the network or bus 42 of the vehicle 32 to an actuator (not shown) for opening a vehicle door.

The RF signal sent via the antenna 34 may contain a data packet with ID data space providing a number of unique fob IDs. Additionally, the RF data packet may generate error checking data and fob qualifier data (e.g. battery state, motion state, etc.) as an optional prefix and/or optional suffix to the unique fob ID.

Radio Frequency Identification

In one embodiment, the fob 12 contains a microchip, the microprocessor-based controller 18, and an RF transmitter 16 including an antenna 14 which operates at a certain frequency, stores a specific ID and other user or object-related data, and sends the data to the receiver 36 of the device 30 at certain times or upon request.

The device 30 comprises the antenna 34 and the transceiver 36, and reads data from, and writes data to the fob 12. The antenna 34 establishes the communication between the fob 12 and the transceiver 36, and its shape and dimensions determine the performance characteristics such as the frequency range. Larger antenna loops tend to yield wider coverage areas, but the signal-to-noise ratio decreases at the same time.

The frequency on which the system 10 operates is another important element, which determines the characteristics of the signals traveling between the devices 12 and 30. Available frequencies include low frequency (LF), high frequency (HF), and ultra-high frequency (UHF). Super-high frequency (SHF) or microwave is also used. UHF passive fobs offer simple and inexpensive solutions. Active fobs typically operate on UHF.

Ultra Wideband

The signaling fob 12 can be designed to utilize Ultra Wideband (UWB) as another type of short-range communication radio technology. UWB systems can be made to accurately locate a fob in three dimensions despite signal attenuation and multiple signal pathways. UWB is able to provide 2- and 3-D localization even in the presence of severe multipath by detecting time-of-flight of the radio transmissions at various frequencies. Another advance of the UWB system is the low average power requirement that results from low pulse rate.

Generally, the system 10 associates pedestrians with a radio frequency fob 12 capable of emitting, preferably on an intermittent basis, UWB signals which signals include information identifying the fobs. The one or more signals are received by UWB devices 30 which are at one or more known locations on the vehicle. Increasing the number of receivers, increases the accuracy of the fob's location. The method may also include communicating at least fob identification information and one or more of time-of-arrival information and angle-of-arrival information from the UWB receivers to the control logic.

A UWB device 30 includes an RF sensor or receiver 36 which receives the UWB signals emitted by the fob 12 and communicate information to a device 30 for further routing or processing. Other information may comprise the UWB fob identification, time-of-arrival, angle of arrival, any available environmental condition information, and combinations of them. Such communication may be wired or wireless and may be routed through intermediate devices.

A UWB signal is preferably pulsed every second or every two seconds, and the pulse rate is designed based upon the desired battery life of the key fob 12, and the need to track movement direction and rate of pedestrians or objects.

Similar to the descriptions above, other communication protocols are available. These include Wireless Fidelity (Wi-Fi). Wi-Fi is capable of a range of many meters.

Another communication protocol is Bluetooth. Bluetooth is a standard wire-replacement communications protocol primarily designed for low-power consumption, with a short range based on low-cost transceiver microchips in each device. Because the devices use a radio (broadcast) communications system, they do not have to be in visual line of sight of each other. Range for 4.2 Bluetooth LE beacons (BLE 4.2) is power-class-dependent as shown in the following table:

| Power Class | Max. Permitted Power (mW) | (dBm) | Typ. range (m) |
| --- | --- | --- | --- |
| 1 | 100 | 20 | ~100 |
| 2 | 2.5 | 4 | ~10 |
| 3 | 1 | 0 | ~1 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for remotely controlling the position of a land vehicle door which is capable of moving between a closed position in which the door covers a vehicle opening and an opened position in which the door uncovers the opening to provide access to the opening, the system comprising:
    a mobile communication device supported on the vehicle for movement therewith;
    a hand-held communication device including a motion sensor operative to provide motion signals as a function of motions made by a pedestrian carrying the hand-held device; and
    control logic coupled to the devices, wherein the hand-held and mobile communication devices are capable of wirelessly transmitting and receiving, respectively, command signals as long as the pedestrian carrying the hand-held device is within a first range of the mobile device, each of the command signals containing identification data which identifies the hand-held device and command data which identifies a pedestrian command for the vehicle to automatically perform an operation, the mobile device being operative to remove the identification and command data from the command signals and the control logic being operative to determine if the hand-held device is an authorized hand-held device based on the identification data, and wherein the control logic is operative to detect a sequence of step motions made by the pedestrian carrying an authorized hand-held device when the pedestrian carrying the authorized hand-held device is located within a second range of the mobile device and to generate a door-opening control signal based on the command data when the control logic recognizes the detected sequence of step motions as a door-opening pedestrian command and wherein the second range is less than the first range.

2. The system as claimed in claim 1, wherein the step motions include walking, standing still and stepping.

3. The system as claimed in claim 1, wherein the motion sensor comprises an inertial motion sensor.

4. The system as claimed in claim 3, wherein the inertial motion sensor includes a multi-axis accelerometer to measure linear acceleration.

5. The system as claimed in claim 1, wherein the hand-held device includes an energy storage device to supply stored electrical energy to the control logic and the motion sensor.

6. The system as claimed in claim 5, wherein the energy storage device comprises a battery.

7. The system as claimed in claim 1, wherein the mobile device includes a receiver and wherein the hand-held device includes a transmitter to wirelessly transmit the command signals which are received by the receiver.

8. The system as claimed in claim 7, wherein the hand-held device includes a user interface coupled to the control logic and wherein the control logic is operative to determine whether the pedestrian has activated the interface to control the transmitter to transmit one of the command signals.

9. The system as claimed in claim 8, wherein the user interface includes a push button dedicated to opening the vehicle door.

10. The system as claimed in claim 1, wherein the hand-held device is a key fob.

11. The system as claimed in claim 1, wherein the mobile device includes a first transceiver and wherein the hand-held device includes a second transceiver that communicates with the first transceiver via two-way communication and wherein the control logic monitors the position of the hand-held device with respect to the mobile device based on data received from the second transceiver.

12. The system as claimed in claim 1, further comprising a memory for storing reference data which represents a predetermined sequence of step motions, the control logic retrieving the reference data from the memory in order to recognize the predetermined sequence of step motions as the door-opening, pedestrian command.

13. A key fob for use in a remote control system which controls the position of a land vehicle door which is capable of moving between a closed position in which the door covers a vehicle opening and an opened position in which the door uncovers the opening to provide access to the opening, the system having a mobile communication device supported on the vehicle for movement therewith, the key fob comprising:
- a hand-held communication device including a motion sensor operative to provide motion signals as a function of motions made by a pedestrian carrying the hand-held device; and
- control logic coupled to the motion sensor, wherein the key fob is capable of wirelessly transmitting command signals as long as the pedestrian carrying the key fob is within a first range of the mobile device, each of the command signals containing identification data which identifies the key fob and command data which identifies a pedestrian command for the vehicle to automatically perform an operation, the mobile device being operative to remove the identification and command data from the command signals and the control logic being operative to determine if the key fob is an authorized key fob based on the identification data, and wherein the control logic is operative to detect a sequence of step motions made by the pedestrian carrying an authorized key fob when the pedestrian carrying the authorized key fob is located within a second range of the mobile device and to generate a door-opening control signal based on the command data when the control logic recognizes the detected sequence of step motions as a door-opening pedestrian command and wherein the second range is less than the first range.

14. The key fob as claimed in claim 13, wherein the step motions include walking, standing still and stepping.

15. The key fob as claimed in claim 13, wherein the motion sensor comprises an inertial motion sensor.

16. The key fob as claimed in claim 15, wherein the inertial motion sensor includes a multi-axis accelerometer to measure linear acceleration.

17. The key fob as claimed in claim 15, further comprising an energy storage device to supply stored electrical energy to the control logic and the motion sensor.

18. The key fob as claimed in claim 17, wherein the energy storage device comprises a battery.

19. The key fob as claimed in claim 13, further comprising a transmitter coupled to the control logic to wirelessly transmit the command signals.

20. The key fob as claimed in claim 19, further comprising a user interface coupled to the control logic and wherein the control logic is operative to determine whether the pedestrian has activated the interface to control the transmitter to transmit one of the command signals.

21. The key fob as claimed in claim 20, wherein the user interface includes a push button dedicated to opening the vehicle door.

22. The key fob as claimed in claim 13, further comprising a transceiver coupled to the control logic to wirelessly transmit the command signals and to wirelessly receive signals.

23. The key fob as claimed in claim 13, further comprising a memory for storing reference data which represents a predetermined sequence of step motions, the control logic retrieving the reference data from the memory in order to recognize the predetermined sequence of step motions as the door-opening, pedestrian command.

* * * * *